US012769040B2

(12) United States Patent
Ockenfuss

(10) Patent No.: US 12,769,040 B2
(45) Date of Patent: Oct. 20, 2026

(54) LOW ANGLE SHIFT FILTER HAVING EFFECTIVE REFRACTIVE INDEX

(71) Applicant: VIAVI Solutions Inc., San Jose, CA (US)

(72) Inventor: Georg J. Ockenfuss, Santa Rosa, CA (US)

(73) Assignee: VIAVI Solutions Inc., San Jose, CA (US)

( * ) Notice: Subject to any disclaimer, the term of this patent is extended or adjusted under 35 U.S.C. 154(b) by 216 days.

(21) Appl. No.: 17/249,968

(22) Filed: Mar. 19, 2021

(65) Prior Publication Data

US 2021/0302635 A1 Sep. 30, 2021

Related U.S. Application Data

(60) Provisional application No. 62/994,643, filed on Mar. 25, 2020.

(51) Int. Cl.
*G02B 5/28* (2006.01)

(52) U.S. Cl.
CPC ............. *G02B 5/285* (2013.01); *G02B 5/288* (2013.01)

(58) Field of Classification Search
CPC .............................................. G02B 5/285–288
See application file for complete search history.

(56) References Cited

U.S. PATENT DOCUMENTS 6,278,549 B1 * 8/2001 Gaebe .................... G02B 5/285 427/164
6,522,469 B1 * 2/2003 Fuqua .................... G02B 5/288 359/578
7,019,905 B2 * 3/2006 Weber .................... G02B 5/285 359/359
10,168,459 B2 1/2019 Ockenfuss
11,022,733 B2 6/2021 Eisenhammer
11,143,803 B2 10/2021 Ockenfuss
2002/0080493 A1 * 6/2002 Tsai ....................... G02B 5/288 359/578
2008/0142144 A1 6/2008 Sidorin
2016/0238759 A1 8/2016 Sprague et al.
(Continued)

FOREIGN PATENT DOCUMENTS

CN 107841712 A 3/2018
CN 108121026 A 6/2018
(Continued)

OTHER PUBLICATIONS

International Search Report and Written Opinion for Application No. PCT/US2021/070303, mailed on Jul. 2, 2021, 12 pages.

*Primary Examiner* — Ryan S Dunning
(74) *Attorney, Agent, or Firm* — Harrity & Harrity, LLP

(57) ABSTRACT

An optical thin film filter may include a first set of filter layers with a first refractive index. The optical thin film filter may include a second set of filter layers with a second refractive index. A first set of thicknesses of the first set of filter layers, a second set of thicknesses of the second set of filter layers, the first refractive index, and the second refractive index may be configured to cause the optical thin film filter to achieve less than a threshold angle shift at a particular wavelength. The optical thin film filter may have an effective refractive index greater than or equal to 95% of a refractive index of a highest refractive index component material of the optical thin film filter.

20 Claims, 19 Drawing Sheets

(56) References Cited

U.S. PATENT DOCUMENTS

| | | | | |
|---|---|---|---|---|
| 2017/0236861 | A1* | 8/2017 | Ockenfuss | G02B 5/26 257/432 |
| 2019/0352222 | A1 | 11/2019 | Zhang et al. | |
| 2020/0033519 | A1 | 1/2020 | Toda | |
| 2023/0012033 | A1* | 1/2023 | Bourreau | H01L 27/14621 |

FOREIGN PATENT DOCUMENTS

| | | | |
|---|---|---|---|
| CN | 110622049 | A | 12/2019 |
| CN | 110737038 | A | 1/2020 |
| DE | 102017004828 | A1 | 11/2018 |
| TW | 201827867 | A | 8/2018 |
| TW | 201901194 | A | 1/2019 |
| TW | 201923126 | A | 6/2019 |
| TW | 202008012 | A | 2/2020 |

* cited by examiner

200

210

| Layer # | Material | refractive | Phys thick [nm] |
|---|---|---|---|
| | substrative | 1.47 | |
| 1 | a-Si | 3.75 | 245.50 |
| 2 | SiO2 | 1.47 | 232.24 |
| 3 | a-Si | 3.75 | 167.01 |
| 4 | SiO2 | 1.47 | 346.79 |
| 5 | a-Si | 3.75 | 182.72 |
| 6 | SiO2 | 1.47 | 154.61 |
| 7 | a-Si | 3.75 | 248.23 |
| 8 | SiO2 | 1.47 | 80.27 |
| 9 | a-Si | 3.75 | 253.10 |
| 10 | SiO2 | 1.47 | 94.14 |
| 11 | a-Si | 3.75 | 233.30 |
| 12 | SiO2 | 1.47 | 54.21 |
| 13 | a-Si | 3.75 | 768.64 |
| 14 | SiO2 | 1.47 | 98.08 |
| 15 | a-Si | 3.75 | 242.94 |
| 16 | SiO2 | 1.47 | 50.78 |
| 17 | a-Si | 3.75 | 763.44 |
| 18 | SiO2 | 1.47 | 110.09 |
| 19 | a-Si | 3.75 | 251.19 |
| 20 | SiO2 | 1.47 | 70.06 |
| 21 | a-Si | 3.75 | 622.53 |
| 22 | SiO2 | 1.47 | 289.12 |
| 23 | a-Si | 3.75 | 508.79 |
| 24 | SiO2 | 1.47 | 258.09 |
| 25 | a-Si | 3.75 | 495.16 |
| 26 | SiO2 | 1.47 | 219.60 |
| 27 | a-Si | 3.75 | 639.47 |
| 28 | SiO2 | 1.47 | 155.45 |
| 29 | a-Si | 3.75 | 161.56 |
| 30 | SiO2 | 1.47 | 84.44 |
| 31 | a-Si | 3.75 | 167.80 |
| 32 | SiO2 | 1.47 | 107.94 |
| 33 | a-Si | 3.75 | 178.70 |
| 34 | SiO2 | 1.47 | 91.09 |
| 35 | a-Si | 3.75 | 166.54 |
| 36 | SiO2 | 1.47 | 88.59 |
| 37 | a-Si | 3.75 | 172.87 |
| 38 | SiO2 | 1.47 | 152.48 |
| 39 | a-Si | 3.75 | 132.50 |
| 40 | SiO2 | 1.47 | 204.66 |
| 41 | a-Si | 3.75 | 172.73 |
| 42 | SiO2 | 1.47 | 287.18 |
| 43 | a-Si | 3.75 | 113.90 |
| 44 | SiO2 | 1.47 | 112.01 |
| 45 | a-Si | 3.75 | 63.15 |
| 46 | SiO2 | 1.47 | 43.96 |
| 47 | a-Si | 3.75 | 90.30 |
| 48 | SiO2 | 1.47 | 12.72 |
| 49 | a-Si | 3.75 | 43.63 |
| 50 | SiO2 | 1.47 | 55.88 |
| | air | 1.00 | |

FIG. 2B

310

| Layer # | Material | refractive | Phys thick [nm] |
|---|---|---|---|
| | substrative | 1.47 | |
| 1 | a-Si | 3.78 | 226.22 |
| 2 | SiO2 | 1.47 | 227.37 |
| 3 | a-Si | 3.78 | 166.24 |
| 4 | SiO2 | 1.47 | 312.11 |
| 5 | a-Si | 3.78 | 172.78 |
| 6 | SiO2 | 1.47 | 143.73 |
| 7 | a-Si | 3.78 | 232.82 |
| 8 | SiO2 | 1.47 | 68.75 |
| 9 | a-Si | 3.78 | 232.85 |
| 10 | SiO2 | 1.47 | 86.39 |
| 11 | a-Si | 3.78 | 226.88 |
| 12 | SiO2 | 1.47 | 39.87 |
| 13 | a-Si | 3.78 | 236.18 |
| 14 | SiO2 | 1.47 | 18.74 |
| 15 | a-Si | 3.78 | 237.40 |
| 16 | SiO2 | 1.47 | 27.74 |
| 17 | a-Si | 3.78 | 235.60 |
| 18 | SiO2 | 1.47 | 45.75 |
| 19 | a-Si | 3.78 | 234.77 |
| 20 | SiO2 | 1.47 | 54.52 |
| 21 | a-Si | 3.78 | 233.11 |
| 22 | SiO2 | 1.47 | 34.66 |
| 23 | a-Si | 3.78 | 231.37 |
| 24 | SiO2 | 1.47 | 11.54 |
| 25 | a-Si | 3.78 | 240.21 |
| 26 | SiO2 | 1.47 | 38.00 |
| 27 | a-Si | 3.78 | 233.88 |
| 28 | SiO2 | 1.47 | 132.95 |
| 29 | a-Si | 3.78 | 579.74 |
| 30 | SiO2 | 1.47 | 271.86 |
| 31 | a-Si | 3.78 | 472.11 |
| 32 | SiO2 | 1.47 | 228.22 |
| 33 | a-Si | 3.78 | 463.55 |
| 34 | SiO2 | 1.47 | 199.33 |
| 35 | a-Si | 3.78 | 596.47 |
| 36 | SiO2 | 1.47 | 144.61 |
| 37 | a-Si | 3.78 | 151.75 |
| 38 | SiO2 | 1.47 | 67.98 |
| 39 | a-Si | 3.78 | 163.67 |
| 40 | SiO2 | 1.47 | 93.19 |
| 41 | a-Si | 3.78 | 161.54 |
| 42 | SiO2 | 1.47 | 84.25 |
| 43 | a-Si | 3.78 | 160.44 |
| 44 | SiO2 | 1.47 | 89.21 |
| 45 | a-Si | 3.78 | 152.64 |
| 46 | SiO2 | 1.47 | 97.79 |
| 47 | a-Si | 3.78 | 138.75 |
| 48 | SiO2 | 1.47 | 272.80 |
| 49 | a-Si | 3.78 | 118.85 |
| 50 | SiO2 | 1.47 | 308.31 |
| 51 | a-Si | 3.78 | 119.95 |
| 52 | SiO2 | 1.47 | 210.33 |
| | air | 1.00 | |

FIG. 3B

410

| Layer # | Material | refractive | Phys Thick [ nm ] |
|---|---|---|---|
| | substrate | 1.47 | |
| 1 | a-Si | 3.75 | 25.00 |
| 2 | SiO2 | 1.47 | 204.01 |
| 3 | a-Si | 3.75 | 374.22 |
| 4 | SiO2 | 1.47 | 201.42 |
| 5 | a-Si | 3.75 | 171.24 |
| 6 | SiO2 | 1.47 | 364.90 |
| 7 | a-Si | 3.75 | 123.81 |
| 8 | SiO2 | 1.47 | 971.91 |
| 9 | a-Si | 3.75 | 138.37 |
| 10 | SiO2 | 1.47 | 331.75 |
| 11 | a-Si | 3.75 | 174.33 |
| 12 | SiO2 | 1.47 | 139.92 |
| 13 | a-Si | 3.75 | 507.27 |
| 14 | SiO2 | 1.47 | 148.97 |
| 15 | a-Si | 3.75 | 208.77 |
| 16 | SiO2 | 1.47 | 101.75 |
| 17 | a-Si | 3.75 | 1277.00 |
| 18 | SiO2 | 1.47 | 45.78 |
| 19 | a-Si | 3.75 | 227.31 |
| 20 | SiO2 | 1.47 | 106.32 |
| 21 | a-Si | 3.75 | 1517.17 |
| 22 | SiO2 | 1.47 | 138.82 |
| 23 | a-Si | 3.75 | 182.36 |
| 24 | SiO2 | 1.47 | 195.21 |
| 25 | a-Si | 3.75 | 119.38 |
| 26 | SiO2 | 1.47 | 203.58 |
| 27 | a-Si | 3.75 | 56.23 |
| 28 | SiO2 | 1.47 | 88.69 |
| 29 | a-Si | 3.75 | 87.85 |
| 30 | SiO2 | 1.47 | 329.28 |
| 31 | a-Si | 3.75 | 199.75 |
| 32 | SiO2 | 1.47 | 97.51 |
| 33 | a-Si | 3.75 | 140.78 |
| 34 | SiO2 | 1.47 | 25.00 |
| | air | 1.00 | |

FIG. 4B

510

| Layer # | Material | refractive | Phys thick [nm] |
|---|---|---|---|
| | substrative | 1.47 | |
| 1 | NbTiO5 | 2.38 | 10.51 |
| 2 | SiO2 | 1.47 | 29.88 |
| 3 | NbTiO5 | 2.38 | 88.10 |
| 4 | SiO2 | 1.47 | 12.95 |
| 5 | NbTiO5 | 2.38 | 27.40 |
| 6 | SiO2 | 1.47 | 26.17 |
| 7 | NbTiO5 | 2.38 | 124.84 |
| 8 | SiO2 | 1.47 | 20.61 |
| 9 | NbTiO5 | 2.38 | 130.43 |
| 10 | SiO2 | 1.47 | 21.90 |
| 11 | NbTiO5 | 2.38 | 130.70 |
| 12 | SiO2 | 1.47 | 24.38 |
| 13 | NbTiO5 | 2.38 | 129.20 |
| 14 | SiO2 | 1.47 | 27.16 |
| 15 | NbTiO5 | 2.38 | 126.90 |
| 16 | SiO2 | 1.47 | 31.31 |
| 17 | NbTiO5 | 2.38 | 119.95 |
| 18 | SiO2 | 1.47 | 52.22 |
| 19 | NbTiO5 | 2.38 | 28.59 |
| 20 | SiO2 | 1.47 | 16.56 |
| 21 | NbTiO5 | 2.38 | 65.21 |
| 22 | SiO2 | 1.47 | 111.41 |
| 23 | NbTiO5 | 2.38 | 3.97 |
| 24 | SiO2 | 1.47 | 65.50 |
| 25 | NbTiO5 | 2.38 | 20.85 |
| 26 | SiO2 | 1.47 | 208.95 |
| 27 | NbTiO5 | 2.38 | 12.65 |
| 28 | SiO2 | 1.47 | 215.73 |
| 29 | NbTiO5 | 2.38 | 11.11 |
| 30 | SiO2 | 1.47 | 219.83 |
| 31 | NbTiO5 | 2.38 | 11.47 |
| 32 | SiO2 | 1.47 | 219.85 |
| 33 | NbTiO5 | 2.38 | 12.50 |
| 34 | SiO2 | 1.47 | 214.48 |
| 35 | NbTiO5 | 2.38 | 15.81 |
| 36 | SiO2 | 1.47 | 200.13 |
| 37 | NbTiO5 | 2.38 | 36.89 |
| 38 | SiO2 | 1.47 | 41.18 |
| 39 | NbTiO5 | 2.38 | 19.45 |
| 40 | SiO2 | 1.47 | 76.65 |
| 41 | NbTiO5 | 2.38 | 114.83 |
| 42 | SiO2 | 1.47 | 34.08 |
| 43 | NbTiO5 | 2.38 | 124.70 |
| 44 | SiO2 | 1.47 | 30.26 |
| 45 | NbTiO5 | 2.38 | 126.94 |
| 46 | SiO2 | 1.47 | 27.69 |
| 47 | NbTiO5 | 2.38 | 128.34 |
| 48 | SiO2 | 1.47 | 24.72 |
| 49 | SiO2 | 1.47 | 129.14 |
| 50 | SiO2 | 1.47 | 21.14 |
| 51 | NbTiO5 | 2.38 | 129.15 |
| 52 | SiO2 | 1.47 | 17.86 |
| 53 | NbTiO5 | 2.38 | 128.70 |
| 54 | SiO2 | 1.47 | 16.79 |
| 55 | NbTiO5 | 2.38 | 129.65 |
| 56 | SiO2 | 1.47 | 18.05 |
| 57 | NbTiO5 | 2.38 | 130.86 |
| 58 | SiO2 | 1.47 | 19.75 |
| 59 | NbTiO5 | 2.38 | 131.09 |
| 60 | SiO2 | 1.47 | 20.33 |
| 61 | NbTiO5 | 2.38 | 130.92 |
| 62 | SiO2 | 1.47 | 19.28 |
| 63 | NbTiO5 | 2.38 | 130.27 |
| 64 | SiO2 | 1.47 | 17.27 |
| 65 | NbTiO5 | 2.38 | 129.14 |
| 66 | SiO2 | 1.47 | 16.44 |
| 67 | NbTiO5 | 2.38 | 129.15 |
| 68 | SiO2 | 1.47 | 18.40 |
| 69 | NbTiO5 | 2.38 | 129.96 |
| 70 | SiO2 | 1.47 | 21.97 |
| 71 | NbTiO5 | 2.38 | 129.74 |
| 72 | SiO2 | 1.47 | 25.36 |
| 73 | NbTiO5 | 2.38 | 128.89 |
| 74 | SiO2 | 1.47 | 27.87 |
| 75 | NbTiO5 | 2.38 | 128.07 |
| 76 | SiO2 | 1.47 | 29.49 |
| 77 | NbTiO5 | 2.38 | 127.63 |
| 78 | SiO2 | 1.47 | 29.95 |
| 79 | NbTiO5 | 2.38 | 127.78 |
| 80 | SiO2 | 1.47 | 29.88 |
| 81 | NbTiO5 | 2.38 | 127.99 |
| 82 | SiO2 | 1.47 | 29.25 |
| 83 | NbTiO5 | 2.38 | 128.47 |
| 84 | SiO2 | 1.47 | 28.65 |
| 85 | NbTiO5 | 2.38 | 128.79 |
| 86 | SiO2 | 1.47 | 27.71 |
| 87 | NbTiO5 | 2.38 | 129.48 |
| 88 | SiO2 | 1.47 | 26.51 |
| 89 | NbTiO5 | 2.38 | 129.79 |
| 90 | SiO2 | 1.47 | 25.20 |
| 91 | NbTiO5 | 2.38 | 129.69 |
| 92 | SiO2 | 1.47 | 24.19 |
| 93 | NbTiO5 | 2.38 | 126.46 |
| 94 | SiO2 | 1.47 | 24.84 |
| 95 | NbTiO5 | 2.38 | 108.06 |
| 96 | SiO2 | 1.47 | 154.04 |
| 97 | NbTiO5 | 1.47 | 82.41 |
| 98 | SiO2 | 1.47 | 71.52 |
| | air | 1.00 | |

FIG. 5B

810

| Layer # | Material | refractive index | Phys Thick ( nm ) |
|---|---|---|---|
| sub | substrate | 1.52 | |
| 1 | Si | 3.75 | 91.94 |
| 2 | SiO2 | 1.47 | 101.94 |
| 3 | Si | 3.75 | 7.73 |
| 4 | SiO2 | 1.47 | 157.20 |
| 5 | Si | 3.75 | 58.33 |
| 6 | SiO2 | 1.47 | 126.21 |
| 7 | Si | 3.75 | 760.00 |
| 8 | SiO2 | 1.47 | 157.20 |
| 9 | Si | 3.75 | 106.92 |
| 10 | SiO2 | 1.47 | 43.95 |
| 11 | Si | 3.75 | 894.04 |
| 12 | SiO2 | 1.47 | 111.36 |
| 13 | Si | 3.75 | 216.37 |
| 14 | SiO2 | 1.47 | 127.82 |
| 15 | Si | 3.75 | 262.30 |
| 16 | SiO2 | 1.47 | 81.48 |
| 17 | Si | 3.75 | 89.11 |
| 18 | SiO2 | 1.47 | 170.95 |
| 19 | Si | 3.75 | 49.12 |
| 20 | SiO2 | 1.47 | 361.48 |
| 21 | Si | 3.75 | 40.43 |
| 22 | SiO2 | 1.47 | 190.08 |
| 23 | Si | 3.75 | 68.61 |
| 24 | SiO2 | 1.47 | 291.29 |
| 25 | Si | 3.75 | 91.36 |
| 26 | SiO2 | 1.47 | 342.46 |
| | air | 1 | |

FIG. 8B

LOW ANGLE SHIFT FILTER HAVING EFFECTIVE REFRACTIVE INDEX

CROSS-REFERENCE TO RELATED APPLICATION

This Patent Application claims priority to U.S. Provisional Patent Application No. 62/994,643, filed on Mar. 25, 2020, and entitled "LOW ANGLE SHIFT FILTER USING A HIGHER ORDER SPACER." The disclosure of the prior Application is considered part of and is incorporated by reference into this Patent Application.

BACKGROUND

A coating system may be used to coat a substrate with a particular material. For example, a pulsed direct current (DC) magnetron sputtering system may be used for deposition of thin film layers, thick film layers, and/or the like. Based on a coating system depositing a set of layers, an optical element may be formed. For example, a thin film (or a non-thin film based coating) may be used to form an optical filter, such as an optical interference filter, a low angle shift filter, a collimator, and/or the like. In some cases, the optical filter may be associated with providing a particular functionality at a particular wavelength of light. For example, a bandpass filter may be used for filtering a near-infrared range of light, a visible range of light, an ultraviolet range of light, and/or the like.

In an example, an optical transmitter may emit light that is directed toward an object. In a case of a gesture recognition system, the optical transmitter may transmit the light toward a user, and the light may be reflected off the user toward an optical receiver. The optical receiver may capture information regarding the light, and the information may be used to identify a gesture being performed by the user. For example, a device may use the information to generate a three-dimensional representation of the user and to identify the gesture being performed by the user based on the three-dimensional representation. In another example, information regarding the light may be used to recognize an identity of the user, a characteristic of the user (e.g., a height or a weight), a characteristic of another type of target (e.g., a distance to an object, a size of the object, a shape of the object, a spectroscopic signature of the object, or a fluorescence of the object), and/or the like.

However, during transmission of the light toward the user and/or during reflection from the user toward the optical receiver, ambient light may interfere with transmitted light. Thus, the optical receiver may be optically coupled to an optical filter, such as a bandpass filter, a collimator, a low angle-shift filter, and/or the like to allow a configured wavelength band of light to pass through toward the optical receiver. For example, a bandpass filter may pass through a first portion of light and block a second portion of light. Based on being configured for a low angle-shift, a low angle-shift filter may permit light from the transceiver with a wide range of incidence angles to be passed through without clipping the light by causing a shift to a bandpass of the filter.

SUMMARY

According to some implementations, an optical thin film filter may include a first set of filter layers with a first refractive index. The optical thin film filter may include a second set of filter layers with a second refractive index. A first set of thicknesses of the first set of filter layers, a second set of thicknesses of the second set of filter layers, the first refractive index, and the second refractive index may be configured to cause the optical thin film filter to achieve less than a threshold angle shift at a particular wavelength. The optical thin film filter may have an effective refractive index greater than or equal to 95% of a refractive index of a highest refractive index component material of the optical thin film filter.

According to some implementations, an optical thin film filter may include alternating high refractive index layers and low refractive index layers. The high refractive index layers may have a first refractive index greater than a threshold and the low refractive index layers have a second refractive index less than or equal to the threshold. The optical thin film filter may have an effective refractive index greater than or equal to 95% of a highest index component material of the optical thin film filter.

According to some implementations, an optical system may include an optical transmitter device, an optical receiver device, and an optical thin film filter disposed in an optical path between the optical transmitter device and the optical receiver device. The optical thin film filter may include a plurality of layers configured with a plurality of thicknesses and two or more refractive indices to cause the optical thin film filter to achieve less than a threshold angle shift at a particular wavelength. The optical thin film filter may have an effective refractive index greater than or equal to 95% of a highest index component material of the plurality of layers.

BRIEF DESCRIPTION OF THE DRAWINGS

FIGS. 2A-2C are diagrams of optical and physical characteristics of an example implementation described herein.

FIGS. 3A-3C are diagrams of optical and physical characteristics of an example implementation described herein.

FIGS. 4A-4C are diagrams of optical and physical characteristics of an example implementation described herein.

FIGS. 5A-5C are diagrams of optical and physical characteristics of an example implementation described herein.

FIGS. 8A-8C are diagrams of optical and physical characteristics of an example implementation described herein.

DETAILED DESCRIPTION

Figure 1:
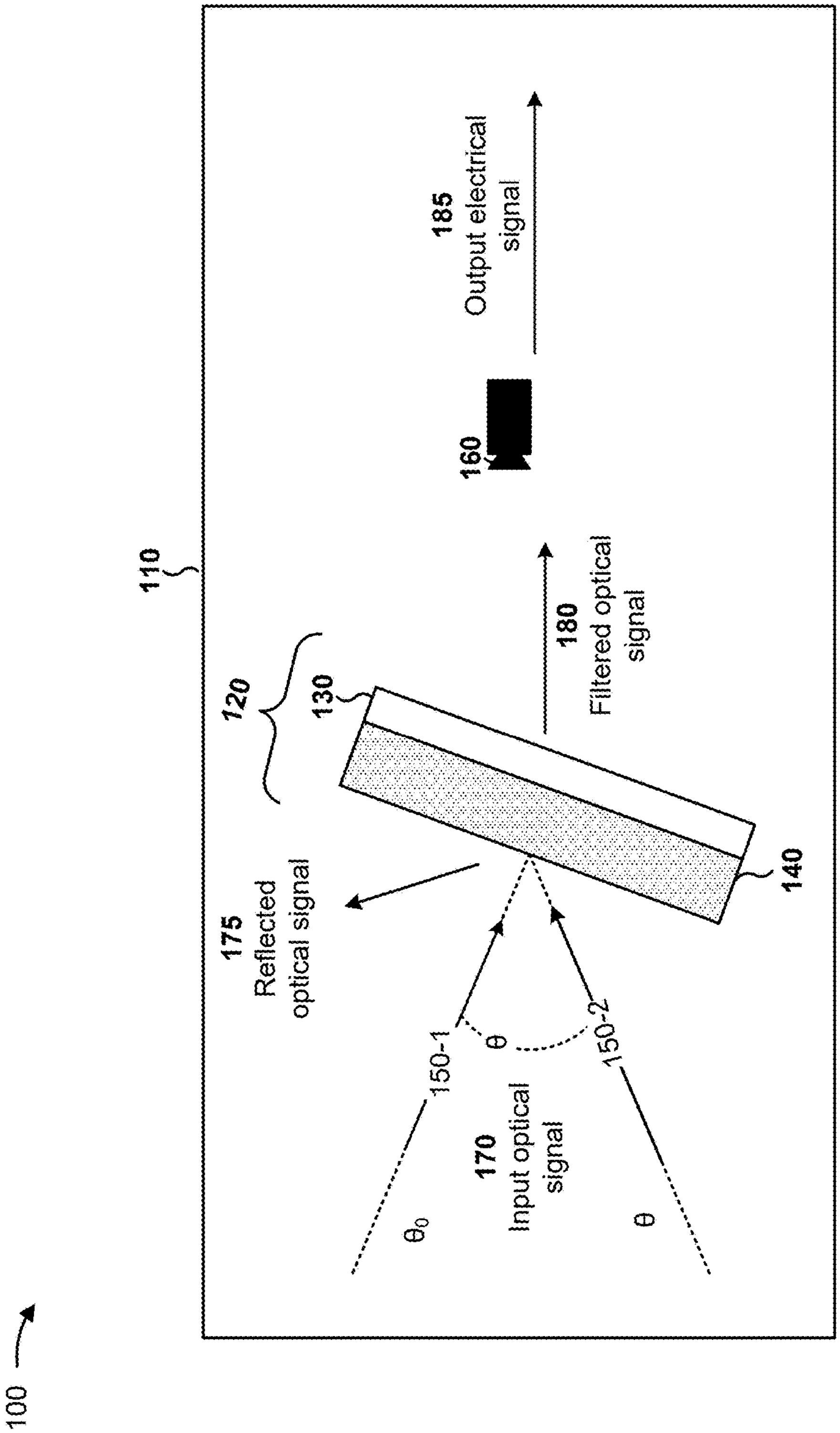
FIG. 1 is a diagram of an overview of an example implementation described herein.

The following detailed description of example implementations refers to the accompanying drawings. The same reference numbers in different drawings may identify the same or similar elements. Although the following description uses various optical systems, such as a sensor system, a spectroscopic system, and/or the like as examples, the systems and methods described herein may be used with any sensor or optical device, including but not limited to other optical sensors and spectral sensors.

An optical sensor device may include a sensor element array of sensor elements to receive light from an optical source, such as an optical transmitter, a light bulb, a laser (e.g., a vertical cavity surface emitting laser (VCSEL), a distributed feedback (DFB) laser, and/or the like), a light emitting diode (LED), an ambient light source, and/or the like. For example, in a three-dimensional sensing system, the optical sensor device may include an array of sensor elements to receive light reflected off a target object, such as a person, thereby enabling an identification of the target object, identification of a gesture being performed by the target object, and/or the like. A sensor element may be associated with an optical filter that filters light to the sensor element to enable the sensor element to obtain information regarding a particular spectral range of electromagnetic frequencies. For example, the sensor element may be aligned with an optical filter with a passband in a visible spectral range, a near-infrared (NIR) spectral range, a mid-wave-infrared (MWIR) spectral range, a long-wave-infrared (LWIR) spectral range, an ultraviolet spectral range, and/or the like. An optical filter may include one or more layers to filter a portion of the light.

However, filter performance of an optical filter may be degraded when an angle of incidence (AOI) of light directed toward the optical filter changes from a configured incidence (e.g., 0 degrees (normal), 30 degrees, 45 degrees, and/or the like) to a threshold angle of incidence (e.g., greater than approximately 10 degrees deviation from the configured incidence, 20 degrees deviation from the configured incidence, 30 degrees deviation from the configured incidence, and/or the like). For example, an interference filter may shift toward lower wavelengths at an increase in an angle of incidence. A magnitude of the shift may be based on an effective refractive index of the interference filter. To capture light (e.g., from a transceiver) at a wide range of angles, the interference filter may be configured with a wider bandwidth. However, using a wider bandwidth may result in an increase in ambient light that is passed through. In this case, as a result, at higher angles of incidence, a signal to noise ratio may decrease based on the ambient light passing through, which may reduce an accuracy of a determination performed based on the sensing.

On the other hand, in a LIDAR system, for example, increasing a signal to noise ratio, such as by enabling a narrower bandwidth filter by reducing angle shift, may enable increased range and accuracy. By increasing range and accuracy, LIDAR systems may be deployed with reduced laser power consumption, which may extend battery life for devices that include LIDAR systems. Moreover, angle shift may reduce a usable range of angles of incidence of light, thereby reducing a usable field of view of a sensor system. In this case, by increasing a usable range of angles of incidence, by achieving low angle shift, a sensor system may perform wide field of view sensing, which may improve sensor system functionality, obviate a need for multiple sensor systems deployed to cover a whole field of view, and/or the like.

Angle shift may be related to an effective refractive index of a bandpass filter. For example, a higher effective refractive index correlates with a lower angle shift. The effective refractive index is calculable from component refractive indices of component materials of the bandpass filter. For example, the effective refractive index, for a filter (e.g., a bandpass filter) with mirrors formed from alternating high refractive index component material layers and low refractive index component material layers, may be calculated based at least in part on a set of equations of the forms:

$$n_{eff\_H} = n_H \cdot \sqrt{\frac{m - (m-1)\cdot\frac{n_L}{n_H}}{(m-1) - (m-1)\cdot\frac{n_L}{n_H} + \frac{n_H}{n_L}}} \quad (1)$$

-continued $$n_{eff\_L} = n_L \cdot \sqrt{\frac{m - (m-1)\cdot\frac{n_L}{n_H}}{m - m\cdot\frac{n_L}{n_H} + \left(\frac{n_L}{n_H}\right)^2}} \quad (2)$$

where $n_{eff\_H}$ is a high bound for the effective refractive index for an optical filter with a high refractive index (e.g., greater than a threshold, such as greater than 2.0) layer as a spacer between the mirrors, $n_{eff\_L}$ is the effective refractive index for the optical filter with a low refractive index (e.g., less than or equal to a threshold, such as less than or equal to 2.0) layer as a spacer between the mirrors, $n_H$ is a refractive index of a high refractive index layer material of each mirror and used in the spacer for $n_{eff\_H}$, $n_L$ is a refractive index of a low refractive index layer material of each mirror and used in the spacer for $n_{eff\_L}$, and m is an order of the spacer (e.g., a size of the spacer as a multiple of ½ of the configured center wavelength of the optical filter). From these equations, a relationship between $n_{eff}$, $N_H$, $n_L$ takes the form:

$$n_H > n_{eff} > n_L \quad (3)$$

Another calculation for effective refractive index may relate to an observed wavelength shift (e.g., an angle shift) of the optical filter. For example, a wavelength shift of an optical filter (e.g., a bandpass filter) at a particular angle of incidence may be determined based on an equation of the form:

$$\lambda_\theta = \lambda_0 \frac{n_{eff}^2 - \sin^2\theta}{n_{eff}^2} \quad (4)$$

where $\lambda_\theta$ represents a center wavelength at angle of incidence θ and $\lambda_\theta$ represents a center wavelength at an angle of incidence for which the optical filter is configured (e.g., a normal angle of incidence or another angle of incidence). The above equation can be rearranged to calculate an effective refractive index based on an observed wavelength shift:

$$n_{eff} = \frac{\lambda_0 \cdot \sin\theta}{\sqrt{\lambda_0^2 - \lambda_\theta^2}} \quad (5)$$

The above equations show that higher effective refractive indices result in lower angle shifts for filters. However, a limit to the effective refractive index of the filter is less than a refractive index of a highest refractive index material in the filter (Eq. 3). Some implementations described herein provide a low angle shift filter where an effective refractive index is greater than 95% of a refractive index of a highest refractive index material in the low angle shift filter. In this way, the optical filter enables improved optical sensing by increasing LIDAR range, improving sensor field of view, and/or the like. For example, the optical filter may improve optical sensing in systems, such as in three-dimensional sensing systems, LIDAR systems, measurement systems, cabin monitoring systems (e.g., automobile cabin monitoring systems), and/or the like.

FIG. 1 is a diagram of an example implementation 100 described herein. As shown in FIG. 1, example implementation 100 includes a sensor system 110. Sensor system 110 may be a portion of an optical system and may provide an electrical output corresponding to a sensor determination. For example, sensor system 110 may be a portion of a LIDAR system, a three-dimensional sensing system, a spectroscopic system, a gesture recognition system, a facial recognition system, an object recognition system, an imaging system, an iris recognition system, a motion tracking system, a communications system, and/or the like.

In some implementations, sensor system 110 may include an optical filter 120, which may include a substrate 130 and a set of filter layers 140. In some implementations, optical filter 120 may be a bandpass filter. For example, optical filter 120 may be configured to pass through a first portion of light at a first range of wavelengths and block a second portion of light at a second range of wavelengths, as described in more detail herein. Additionally, or alternatively, optical filter 120 may be a longwave pass (LWP) filter, a shortwave pass (SWP) filter, an infrared cut-off (IR Cut) filter, a notch filter, and/or the like. In some implementations, optical filter 120 may have a bandpass of between 200 nanometers (nm) and 14000 and be used in a visible spectral range, an NIR spectral range, an MWIR spectral range, an LWIR spectral range, an ultraviolet spectral range, and/or the like. In some implementations, optical filter 120 may be a beam splitter, such as a non-polarizing beam splitter, a polarizing beam splitter, and/or the like. Although some implementations described herein may be described in terms of an optical filter in a sensor system, some implementations described herein may be used in another type of system, in an optical element external to a sensor system, in an optical element of an optical package, and/or the like.

In some implementations, substrate 130 may be a glass substrate, a silicon substrate, a germanium substrate, and/or the like. In some implementations, substrate 130 may be a silicon dioxide substrate with a refractive index of approximately 1.47. In some implementations, filter layers 140 may be a set of alternating high refractive index and low refractive index layers. For example, filter layers 140 may include a high refractive index material, such as amorphous silicon (e.g., with a refractive index of 3.78), niobium titanium oxide (e.g., with a refractive index of 2.38), and/or the like. In some implementations, filter layers 140 may include a silicon layer, a silicon dioxide layer, a hydrogenated silicon layer, a tantalum pentoxide layer, a niobium pentoxide layer, a germanium layer, a silicon germanium layer, a hydrogenated silicon germanium layer, a niobium tantalum oxide layer, a titanium dioxide layer, a silicon nitride layer, an aluminum nitride layer, and/or the like.

Additionally, or alternatively, filter layers 140 may include another type of high refractive index material layer with a refractive index of greater than 2.0, greater than 2.5, greater than 3.0, greater than 3.5, and/or the like. Similarly, filter layers 140 may include a low refractive index material, such as silicon dioxide (e.g., with a refractive index of 1.47). Additionally, or alternatively, filter layers 140 may include another type of low refractive index material layer with a refractive index of less than 2.5, less than 2.0, less than 1.5, less than 1.25, and/or the like. In this case, the alternating high refractive index layers and low refractive index layers may have thicknesses sized to achieve an effective refractive index of, for example, greater than 95% of a refractive index of a highest refractive index component material in optical filter 120. In some implementations, filter layers 140 may include three or more different materials. For example, filter layers 140 may have a subset of hydrogenated silicon layers, a subset of tantalum pentoxide layers, and a subset of silicon dioxide layers. In this case, using three or more different types of layers may enable filter layers 140 to achieve a higher transmissivity and/or a reduced angle shift at some wavelengths relative to using only two different materials.

As further shown in FIG. 1, and as shown by reference number 170, an input optical signal is directed toward optical filter 120 at one or more angles of incidence, θ. For example, input optical signals 150-1 and 150-2 may be directed toward optical filter 120 at angles of incidence $\theta_0$ (e.g., a configured angle of incidence) and θ. As shown by reference number 175, a first portion of the input optical signal is reflected by optical filter 120. For example, based on a portion of the input optical signal being outside of a passband of optical filter 120, optical filter 120 may reflect the portion of the input optical signal.

As further shown in FIG. 1, and by reference number 180, another portion of the optical signal is transmitted through optical filter 120. For example, a portion of the input optical signal within the passband of optical filter 120 is passed through optical filter 120 with less than a threshold angle shift, as described in more detail herein. As shown by reference number 185, based on a portion of the input optical signal being passed to optical sensor 160, optical sensor 160 may provide an output electrical signal for sensor system 110. For example, optical sensor 160 may provide an output electrical signal identifying an intensity of light, a characteristic of light (e.g., a spectroscopic signature), a wavelength of light, and/or the like.

In this way, optical filter 120 utilizes a binary structure to provide a filter (e.g., a bandpass filter or another type of filter) for a sensor system 110.

As indicated above, FIG. 1 is provided merely as an example. Other examples may differ from what is described with regard to FIG. 1.

Figure 2A:
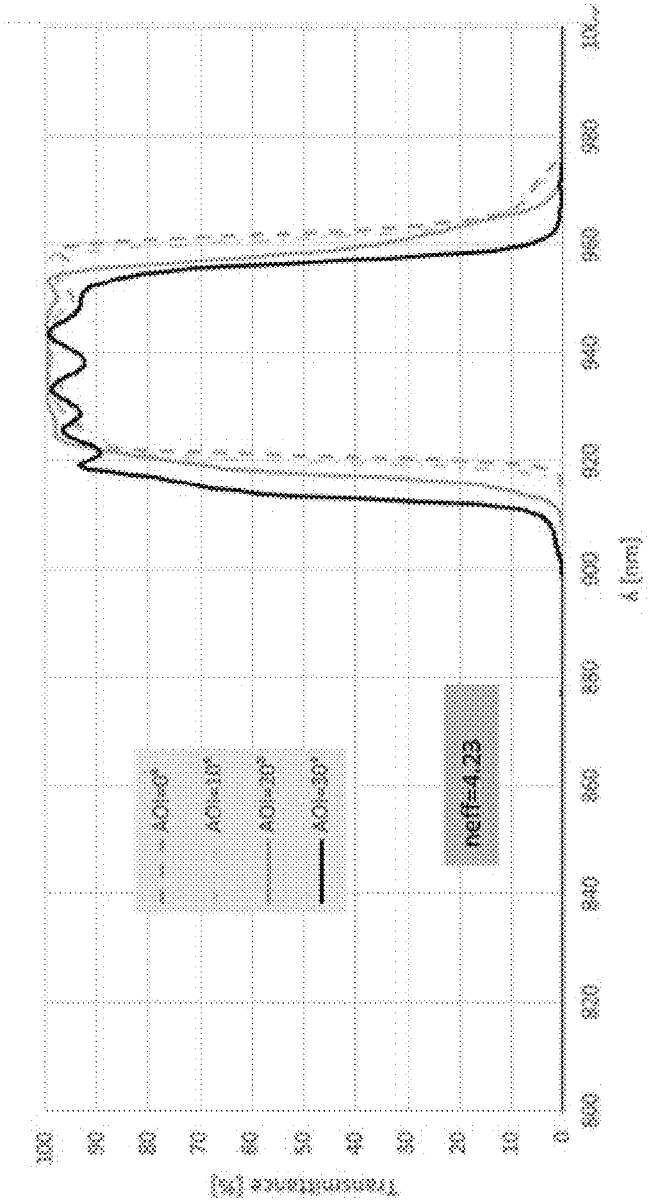
Figure 2C:
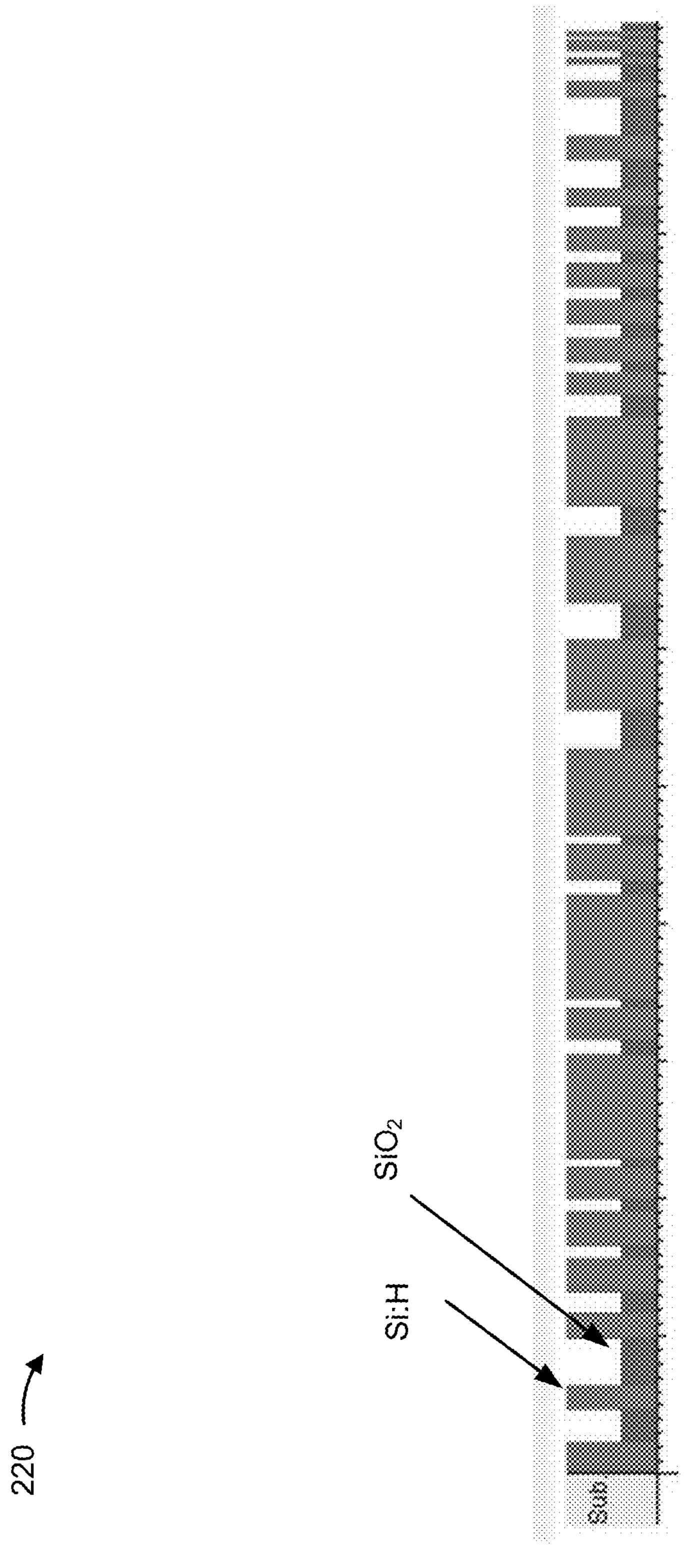

FIGS. 2A-2C are diagrams 200/210/220 of optical and physical characteristics of an example implementation described herein.

As shown in FIG. 2A, diagram 200 shows an angle shift performance of optical filter 120. For example, when optical filter 120 is configured for a center wavelength at 940 nanometers (nm), optical filter 120 may have an angle shift of, for example, less than 10 nm at angles of incidence (AOI) of up to 30 degrees. In some implementations, optical filter 120 may have an angle shift of approximately 6.6 nm at an AOI of 30 degrees. In this case, optical filter 120 may achieve an effective refractive index of 4.23. In some implementations, optical filter 120 may achieve a transmittance, at the center wavelength, of greater than 80%, greater than 85%, greater than 90%, greater than 95%, and/or the like at an AOI of 0 degrees. Similarly, optical filter 120 may achieve a transmittance, at the center wavelength, of greater than 85%, greater than 90%, greater than 93%, and/or the like and less than or equal to 100% at an AOI of at least 30 degrees. Moreover, optical filter 120 may achieve a ripple of less than +/−10%, less than +/−5%, or less than +/−1%, where the ripple represents a deviation in transmittance across the passband at AOIs of between 0 degrees and 30 degrees.

As shown in FIGS. 2B and 2C, diagrams 210 and 220 show an example stack up and an example of layer thicknesses versus refractive indices, respectively, for optical filter 120. In this case, optical filter 120 is manufactured using alternating amorphous silicon (a-Si) layers (e.g., with a refractive index of 3.75) and silicon dioxide (SiO2) layers (e.g., with a refractive index of 1.47). Optical filter 120 includes, as described in more detail herein, one or two "thick layers" with greater than a threshold thickness (e.g., a thickness greater 200% more than a next thickest layer after the one or more two layers (and less than, for example, 500% more than a next thickest layer). In some implementations, optical filter 120 may include two thick layers and the thick layers may deviate by between 10% and 25%. For example, a thickness of a smaller of the two thick layers may be smaller than a thickness of a larger of the two thick layers by between 10% and 25%.

Figure 7:
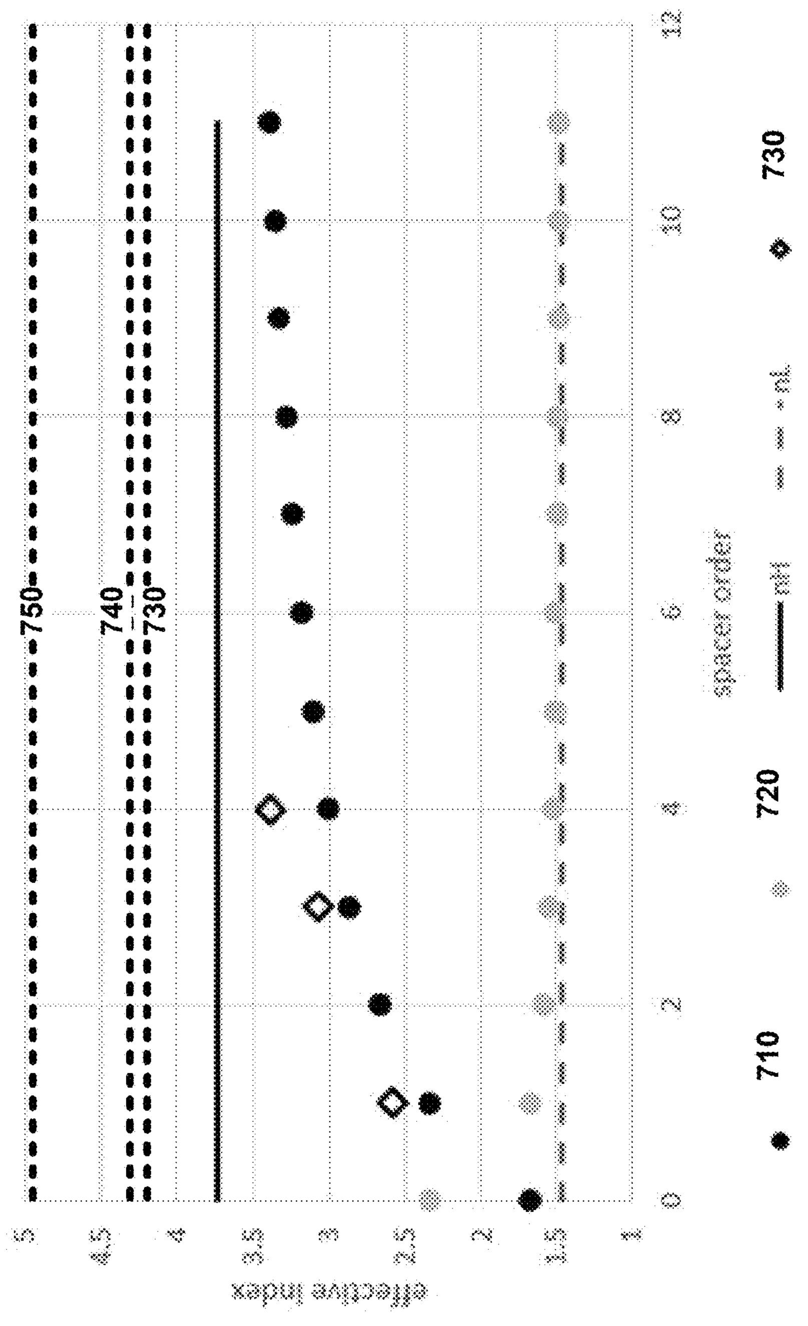
FIG. 7 is a diagram of an effective refractive index of example implementations described herein.

Additionally, or alternatively, the one or two thick layers may be surrounded by one or more other filter layers ("thin layers") that, for example, do not form quarterwave stacks, as may be the case in other optical filter designs, such as low angle shift filters with higher-order spacers, as described in more detail with regard to FIG. 7, and which may have "thick layers" with less than the aforementioned threshold thickness relative to thin layers therein and that deviate from each other by less than the aforementioned range of deviations. In this case, the effective refractive index of optical filter 120 of 4.23 is greater than 112% of the refractive index of the highest refractive index component material (e.g., the amorphous silicon with a refractive index of 3.75). In some implementations, for a similar optical thin film filter with a high refractive index layer of 3.75, a range of effective refractive indices may be greater than or equal to 3.56 and less than or equal to 4.69 (between 95% and 125% of a refractive index of the high refractive index material).

As indicated above, FIGS. 2A-2C are provided merely as an example. Other examples may differ from what is described with regard to FIGS. 2A-2C.

Figure 3A:
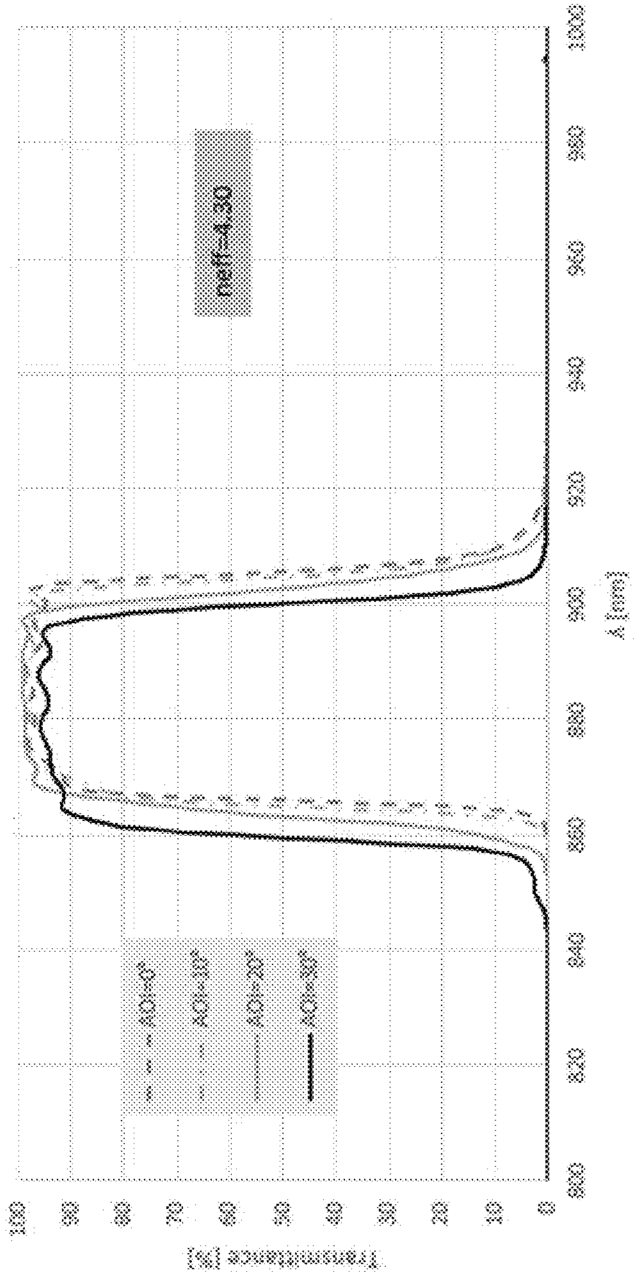
Figure 3C:
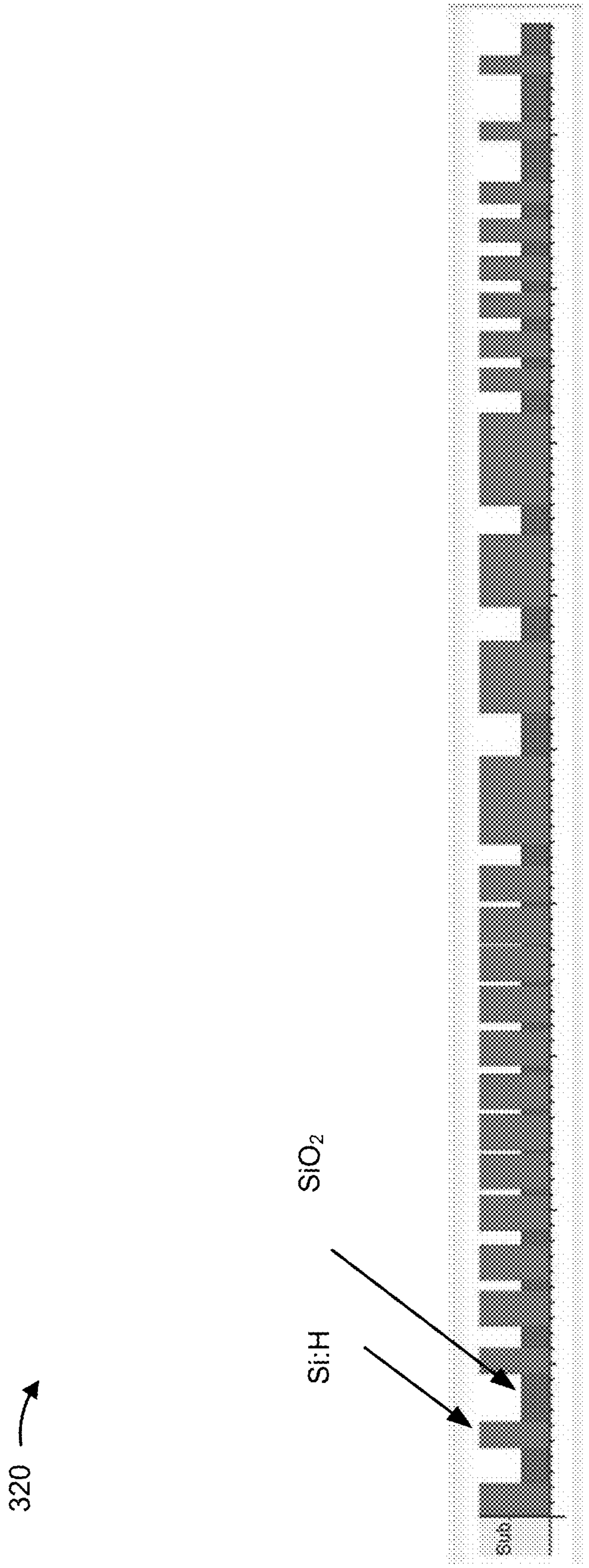

FIGS. 3A-3C are diagrams 300/310/320 of optical and physical characteristics of an example implementation described herein.

As shown in FIG. 3A, diagram 300 shows an angle shift performance of optical filter 120. For example, when optical filter 120 is configured for a center wavelength at 885 nm, optical filter 120 may have an angle shift of, for example, less than 10 nm at an AOI of up to 30 degrees. In some implementations, optical filter may have an angle shift of approximately 6.0 nm at an AOI of 30 degrees. In this case, optical filter 120 may achieve an effective refractive index of 4.30. As shown in FIGS. 3B and 3C, diagrams 310 and 320 show an example stack up and an example of layer thicknesses versus refractive indices, respectively, for optical filter 120. For example, optical filter 120 is manufactured using alternating amorphous silicon layers (e.g., with a refractive index of 3.78) and silicon dioxide layers (e.g., with a refractive index of 1.47). In this case, optical filter 120 is configured with layers with different thicknesses than as shown in FIG. 2B. As a result, the effective refractive index of 4.30 is greater than 113% of the refractive index of the highest refractive index component material (e.g., the amorphous silicon with a refractive index of 3.78).

As indicated above, FIGS. 3A-3C are provided merely as an example. Other examples may differ from what is described with regard to FIGS. 3A-3C.

Figure 4A:
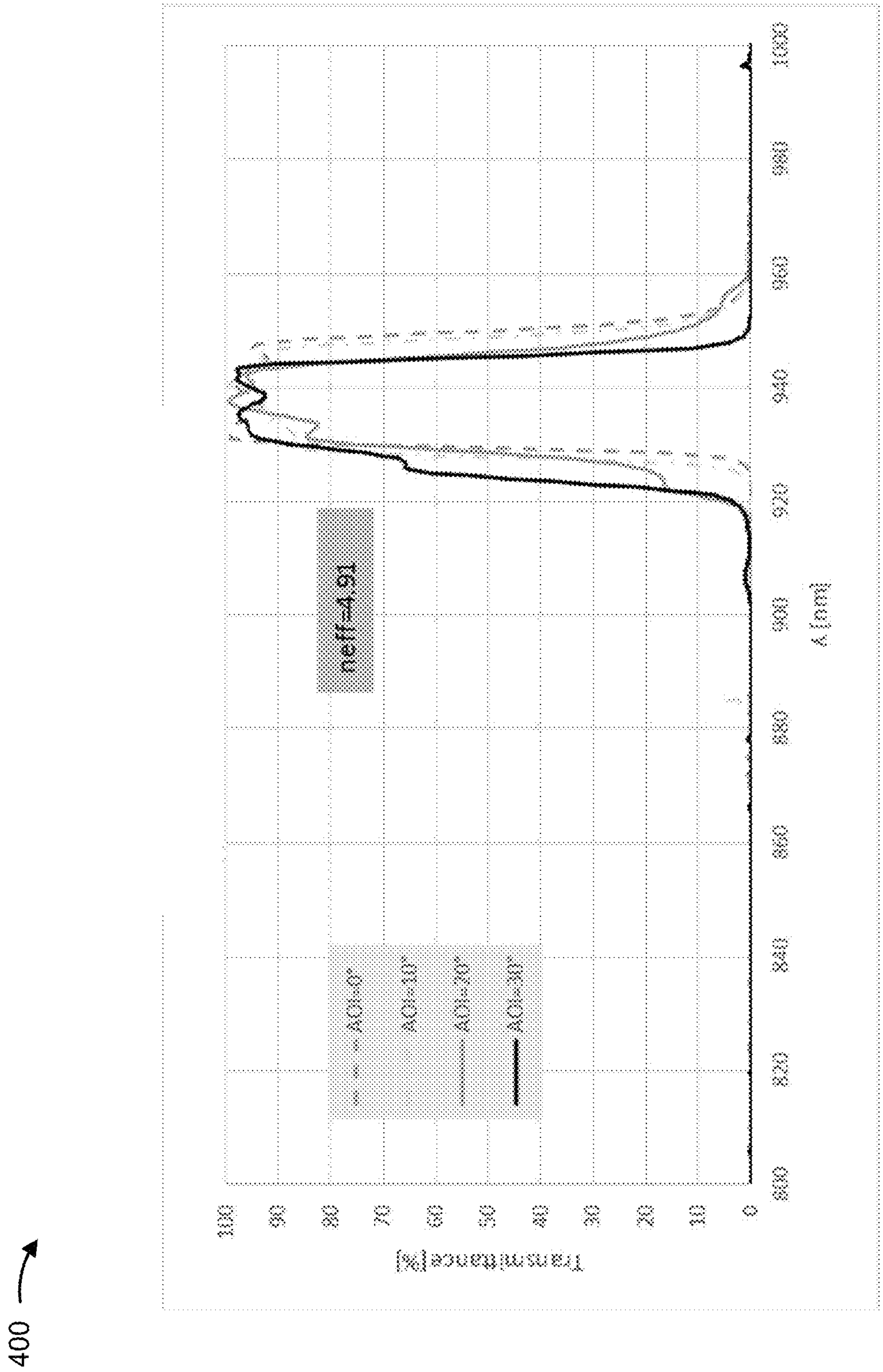
Figure 4C:
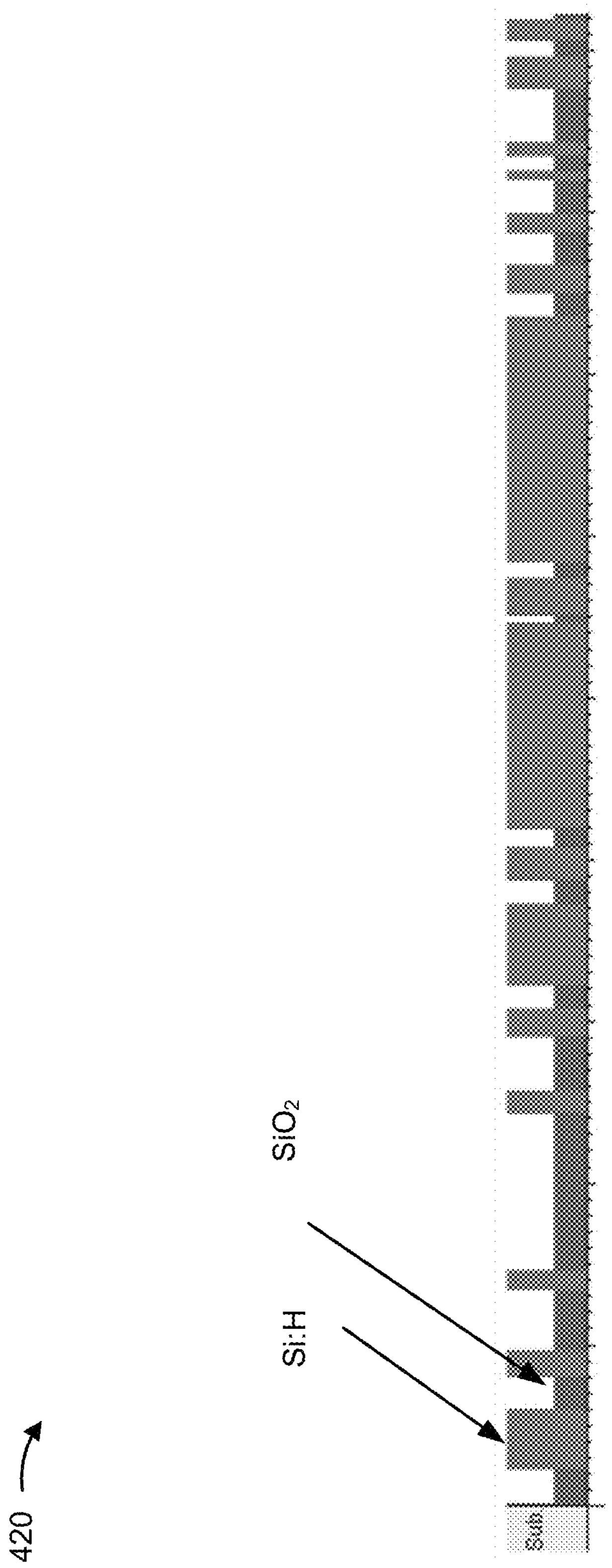

FIGS. 4A-4C are diagrams 400/410/420 of optical and physical characteristics of an example implementation described herein.

As shown in FIG. 4A, diagram 400 shows an angle shift performance of optical filter 120. For example, when optical filter 120 is configured for a center wavelength at 940 nm, optical filter 120 may have an angle shift of, for example, less than 10 nm, less than 9.0 nm, less than 5.0 nm, among other examples at an AOI of up to 30 degrees (e.g., between 0 degrees and 30 degrees). In some implementations, optical filter 120 may achieve an angle shift of 4.9 nm at an AOI of 30 degrees. In this case, optical filter 120 may achieve an effective refractive index of 4.91. As shown in FIGS. 4B and 4C, diagrams 410 and 420 show an example stack up and an example of layer thicknesses versus refractive indices, respectively, for optical filter 120. For example, optical filter 120 is manufactured using alternating amorphous silicon layers (e.g., with a refractive index of 3.75 (between 3.7 and 3.8)) and silicon dioxide layers (e.g., with a refractive index of 1.47 (between 1.4 and 1.5)). In this case, optical filter 120 is configured with layers with different thicknesses than as shown in, for example, FIG. 2B and FIG. 3B. As a result, the effective refractive index of 4.91 (between 4.0 and 5.5) is greater than 130% of the refractive index of the highest refractive index component material (e.g., the amorphous silicon with a refractive index of 3.75).

As indicated above, FIGS. 4A-4C are provided merely as an example. Other examples may differ from what is described with regard to FIGS. 4A-4C.

Figure 5A:
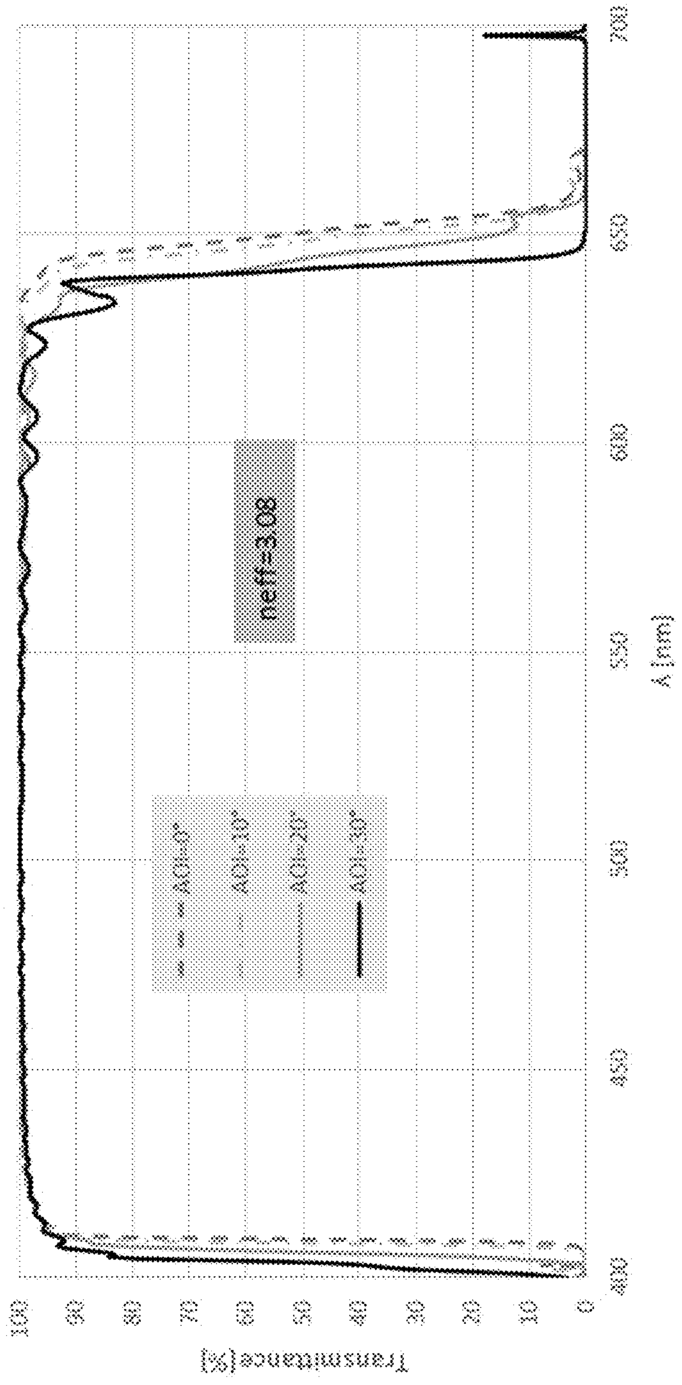
Figure 5C:
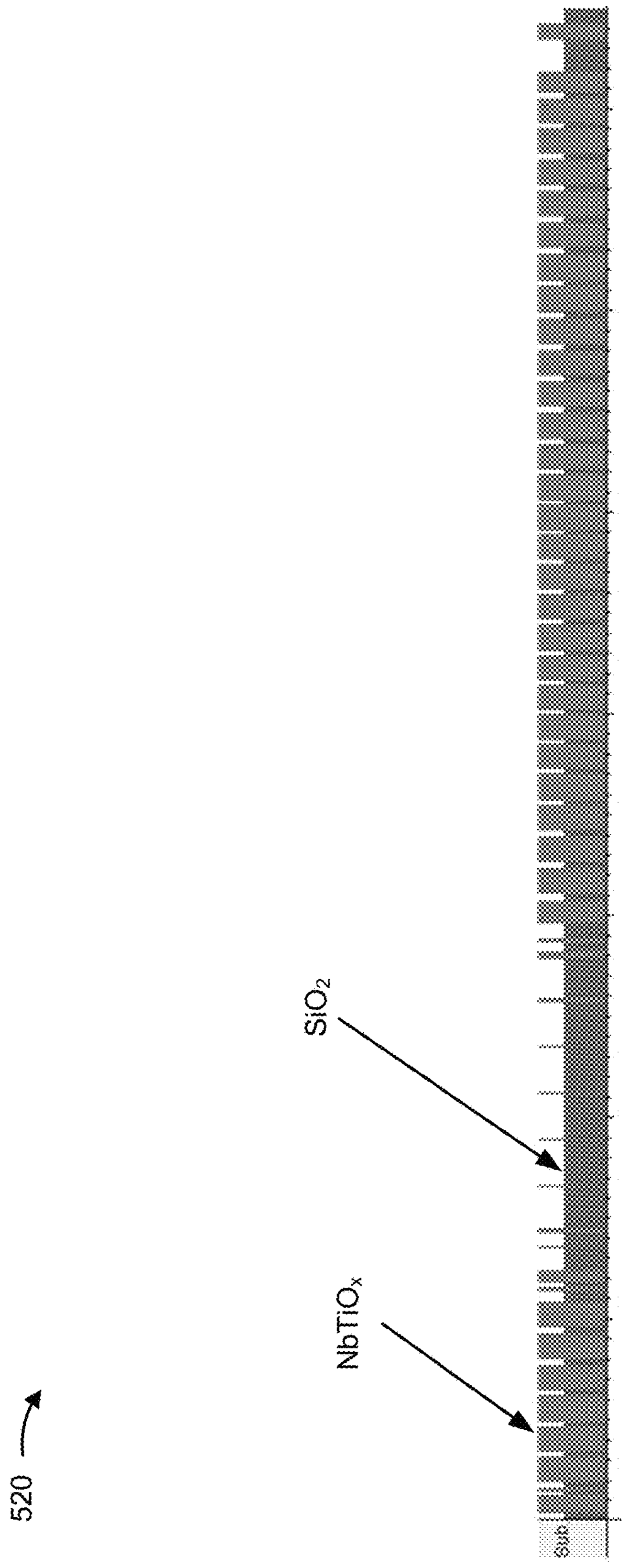

FIGS. 5A-5C are diagrams 500/510/520 of optical and physical characteristics of an example implementation described herein.

As shown in FIG. 5A, diagram 500 shows an angle shift performance of optical filter 120. For example, when optical filter 120 is configured as a short wave pass (SWP) filter with a cut off wavelength at approximately 650 nm, optical filter 120 may have an angle shift of, for example, less than 25 nm at an AOI of up to 30 degrees. In some implementations, optical filter 120 may achieve an angle shift of approximately 8.7 nm at an AOI of 30 degrees. In this case, optical filter 120 may achieve an effective refractive index of 3.08. As shown in FIGS. 5B and 5C, diagrams 510 and 520 show an example stack up and an example of layer thicknesses versus refractive indices, respectively, for optical filter 120. For example, optical filter 120 is manufactured using alternating niobium titanium oxide ($NbTiO_5$) layers (e.g., with a refractive index of 2.38) and silicon dioxide layers (e.g., with a refractive index of 1.47). As a result, the effective refractive index of 3.08 is greater than 129% of the refractive index of the highest refractive index component material (e.g., the niobium titanium oxide with a refractive index of 2.38). Additionally, or alternatively, the effective refractive index may be greater than 2.261 (greater than 95% of the refractive index of niobium titanium oxide) or less than 3.57 (less than 150% of the refractive index of niobium titanium oxide) with, as shown in FIG. 5A, a ripple of up to +/−5% across the passband and for AOIs of between 0 and 20 degrees and a ripple of up to +/−20% across the passband and for AOIs of between 0 degrees and 30 degrees. Although some implementations are described herein in terms of two types of materials for the alternating layers, other quantities of materials may be used. For example, optical filter 120 may be configured with three alternating layers, with two different sets of two alternating layers, or any other combination or quantity of materials.

As indicated above, FIGS. 5A-5C are provided merely as an example. Other examples may differ from what is described with regard to FIGS. 5A-5C.

Figure 6:
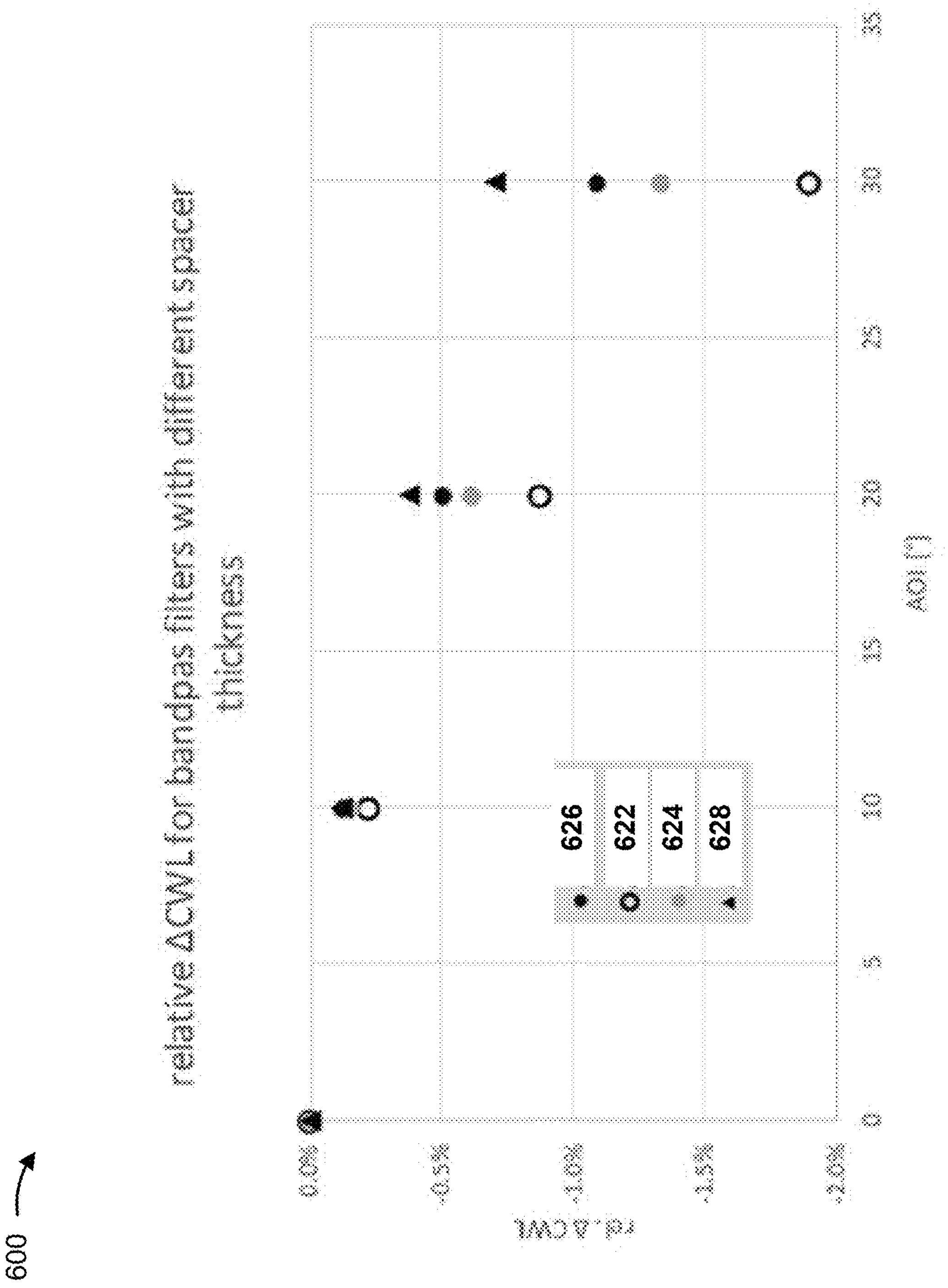
FIG. 6 is a diagram of an angle shift of an example implementation described herein.

FIG. 6 is a diagram 600 of an angle shift of an example implementation described herein.

As shown in FIG. 6, diagram 600 shows a comparison of an angle shift relative to an angle of incidence for an optical filter described herein relative to other types of optical filters. For example, reference numbers 622, 624, and 626 show other optical filter designs with a first order, third order, and fourth order spacer, respectively. In contrast, reference number 628 shows optical filter 120 (e.g., as configured in FIGS. 2A and 2B). As shown, optical filter 120 is associated with a reduced percentage change in center wavelength at angles of incidence of up to at least 30 degrees. For example, for a fourth order spacer at 940 nm, another optical filter may have an angle shift of 10 nm. In contrast, for optical filter 120, the angle shift may be reduced to 6.6 nm, which is a reduction by 34%.

As indicated above, FIG. 6 is provided merely as an example. Other examples may differ from what is described with regard to FIG. 6.

FIG. 7 is a diagram 700 of an effective refractive index of example implementations described herein.

As shown in FIG. 7, diagram 700 shows an analytical calculation of an effective refractive index of an optical filter with alternating high refractive index layers and low refractive index layers. For example, the analytical calculation may be for a high refractive index material with a high refractive index of approximately 3.74 (nH) and a low refractive index material with a low refractive index of approximately 1.46 (nL). As described above, equation (3) for calculating effective refractive index indicates that the high refractive index may be a high bound for an effective refractive index and the low refractive index may be a low bound for the effective refractive index. Similarly, applying equations (1) and (2) to other optical filters with the high refractive index material and the low refractive index material, but with a spacer structure (e.g., with spacer orders ranging from 0 to 11), results in an effective refractive index with a spacer structure using the high refractive index material ($n_{eff\_H}$, as shown by reference number 710) and an effective refractive index with a spacer structure using the low refractive index material ($n_{eff\_L}$, as shown by reference number 720) that is within the bounds of equation (3).

Applying equation (5) to determine, for such other optical filters, an effective refractive index based on an observed angle shift results in, as shown by reference number 730, values that are within the bounds of equation (3) and relatively close to the effective refractive index with the high refractive index material as the spacer structure. In this case, optical filters designed in accordance with reference number 730 may include "thick layers" as cavities in the optical filters. For example, a third order spacer may include 5 "thick layers" that are each approximately 35% thicker than a next thickest layer within such an optical filter. An idealized calculation, one or more filter layers surrounding each of the thick layers may form quarterwave stacks. In this case, deviation between calculations from equations (1) and (2) and calculations from equations (5) may relate to a presence of non-quarterwave stacks in reflector structures of the other optical filters.

However, for optical filter 120, configured using alternating high refractive index layers and low refractive index layers, without a spacer, and with layer thicknesses configured to optimize an effective refractive index, as described herein, the effective refractive index is greater than the high refractive index, as shown by reference numbers 740, 750, and 760, which correspond to optical filter 120 as configured in FIGS. 2A and 2B, FIGS. 3A and 3B, and FIGS. 4A and 4B, respectively. In such cases, optical filter 120 may include one or two "thick layers" that are each between 200% and 500% thicker than a next thickest layer within optical filter 120 (other than the thick layers). In other words, by using thick layers with a thickness ratio, relative to "thin layers" of optical filter 120 of between 2:1 and 5:1, optical filter 120 achieves an effective refractive index between, for example, 95% and 150% of a refractive index of a highest refractive index material within optical filter 120 and without an excessive ripple (e.g., with a transmission deviating up to +/−1%, +/−5%, or +/−10% across a passband, at a center wavelength, at a cut-on wavelength, or at a cut-off wavelength from AOIs of 0 degrees to at least 30 degrees).

In some implementations, optical filter 120 may have an effective refractive index of greater than 95% of a refractive index of a highest refractive index material in the optical filter. For example, optical filter 120 may have an effective refractive index that takes the form:

$$n_{eff} = \frac{\lambda_0 \cdot \sin\theta}{\sqrt{\lambda_0^2 - \lambda_\theta^2}} \geq 0.95 \cdot n_H \tag{6}$$

Additionally, or alternatively, optical filter 120 may have an effective refractive index of greater than 100%, greater than 110%, greater than 120%, and/or the like of a refractive index of a highest refractive index material in optical filter 120. In this way, optical filters described herein may have an angle-shift reduction of at least 10%, at least 20%, at least 30%, at least 35%, and/or the like (and up to, for example, 200%) relative to other optical filters with other filter structures.

As indicated above, FIG. 7 is provided merely as an example. Other examples may differ from what is described with regard to FIG. 7.

Figure 8A:
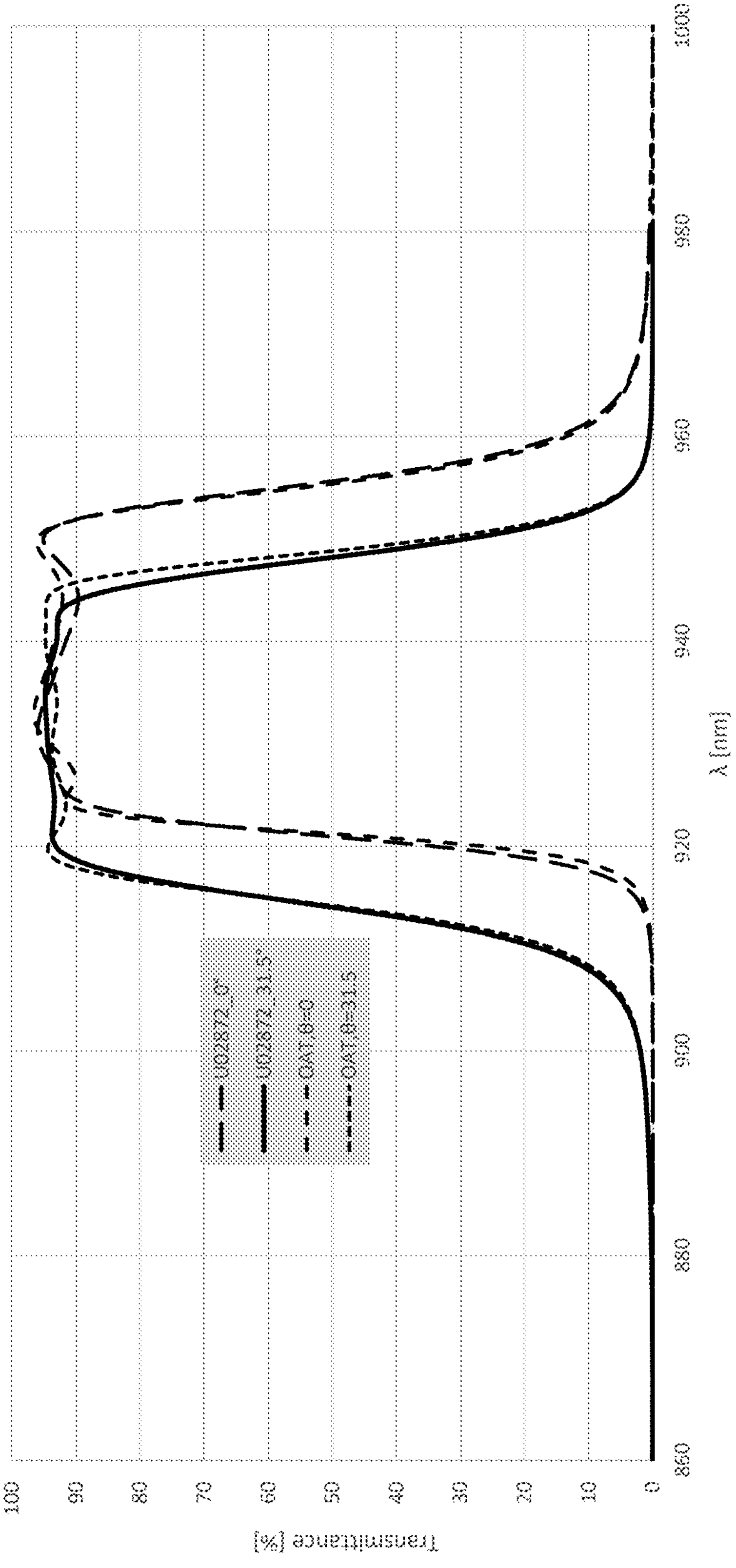
Figure 8C:
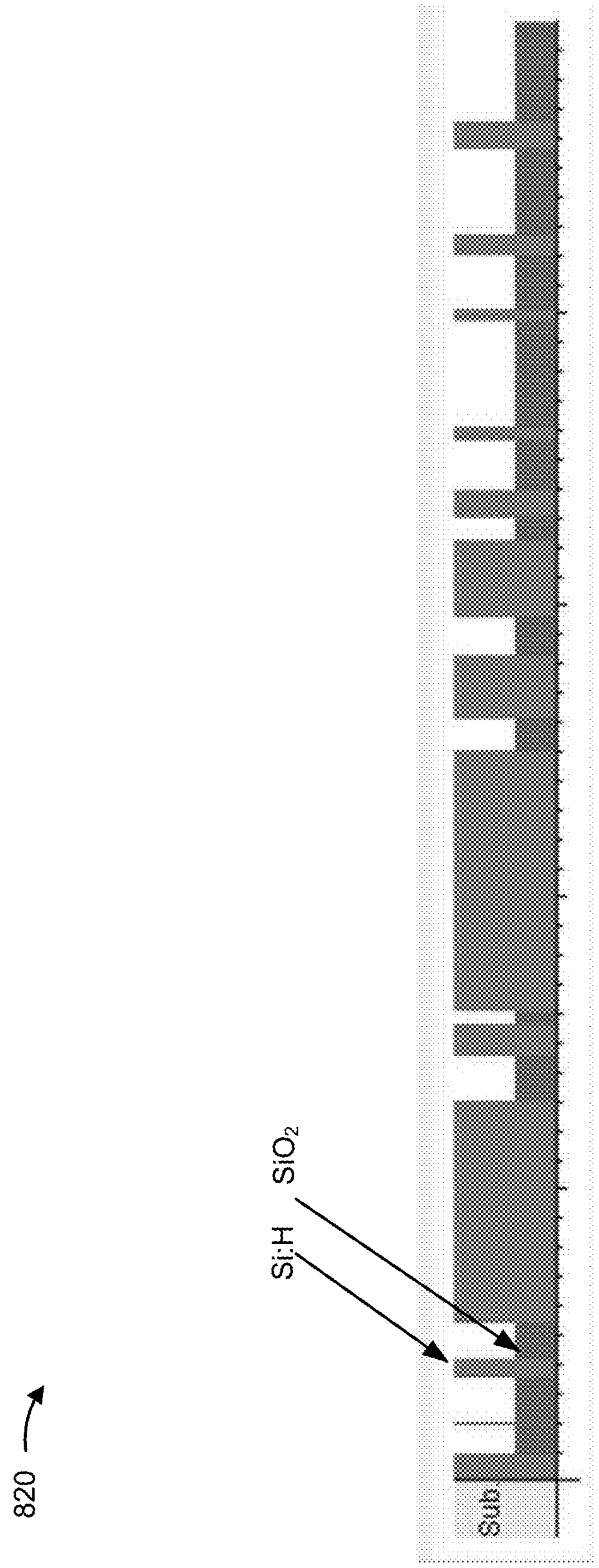

FIGS. 8A-8C are diagrams 800/810/820 of optical and physical characteristics of an example implementation described herein.

As shown in FIG. 8A, diagram 800 shows an angle shift performance of optical filter 120. For example, when optical filter 120 is configured for a center wavelength at 940 nm, optical filter 120 may have an angle shift of, for example, less than 10 nm at an AOI of up to 31.5 degrees. In some implementations, optical filter may have an angle shift of approximately 6.1 nm at an AOI of 31.5 degrees. This optical filter may be termed a hyper-low-angle-shift (hyper-LAS) filter. In this case, optical filter 120 may achieve an effective refractive index of 4.61. As shown in FIGS. 8B and 8C, diagrams 810 and 820 show an example stack up and an example of layer thicknesses versus refractive indices, respectively, for optical filter 120. For example, optical filter 120 is manufactured using alternating silicon layers (e.g., with a refractive index of 3.75) and silicon dioxide layers (e.g., with a refractive index of 1.47). In this case, optical filter 120 is configured with layers with different thicknesses than as shown in FIGS. 2B, 3B, 4B, and 5B. As a result, the effective refractive index of 4.61 is greater than 122% of the refractive index of the highest refractive index component material (e.g., the silicon with a refractive index of 3.75). As further shown in FIGS. 8B and 8C, as well as in FIGS. 4B and 4C, some implementations described herein may have a set of layers that are substantially thicker than some other layers. For example, as shown in FIG. 8B, layers 7 and 11 are more than 300% larger than individual other layers among layers 1-26.

As indicated above, FIGS. 8A-8C are provided merely as an example. Other examples may differ from what is described with regard to FIGS. 8A-8C.

Figure 9:
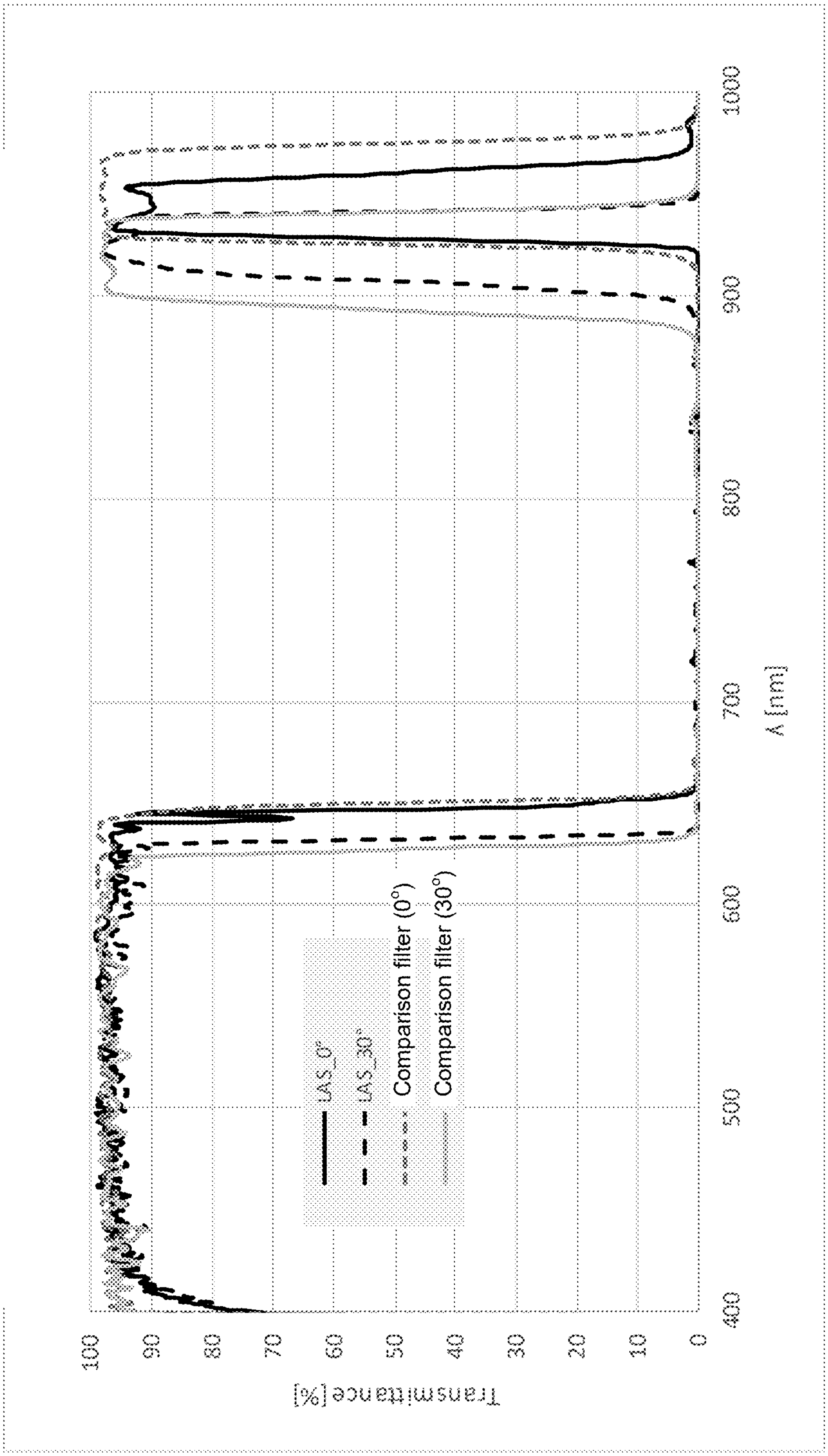
FIG. 9 is a diagram of optical characteristics of an example implementation described herein.

FIG. 9 is a diagram 900 of optical characteristics of an example implementation described herein.

As shown in FIG. 9, diagram 900 shows an angle shift performance of a hyper-LAS dual bandpass implementation of optical filter 120. In some implementations, optical filter 120 may be an n-bandpass filter, where n≥2. An n-bandpass filter may be used in some use cases, such as in-cabin monitoring systems, among other examples. Other low angle shift filters may be possible, such as notch filters. In some implementations, optical filter 120 may have an angle shift cut-off at 650 nm with an angle shift of approximately 14.5 nm at an AOI of up to 30 degrees (which is less than other dual bandpass filters, which may have an angle shift of approximately 22.9 nm, as shown in FIG. 9). Similarly, optical filter 120 may have a center wavelength at 940 nm and angle shift of, for example, less than 20.1 nm at an AOI of up to 30 degrees and a full width half maximum (FWHM) of 33 nm (which is less than other dual bandpass filters, which may have an angle shift of approximately 33.4 nm, as shown in FIG. 9, and an FWHM of approximately 55 nm). In some implementations, optical filter 120 may have a particular set of materials, such as a set of 248 layers of alternating $NbTiO_x$ and $SiO_2$ (with a total thickness of 18.6 μm) on a first side of a substrate and a set of 196 layers of alternating $NbTaO_5$ and $SiO_2$ (with a total thickness of 9 μm) on a second side of the substrate. In this way, a low angle shift may be achieved for an n-bandpass filter.

As indicated above, FIG. 9 is provided merely as an example. Other examples may differ from what is described with regard to FIG. 9.

The foregoing disclosure provides illustration and description, but is not intended to be exhaustive or to limit the implementations to the precise forms disclosed. Modifications and variations may be made in light of the above disclosure or may be acquired from practice of the implementations.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like. Some implementations are described herein in connection with approximate values. As used herein, an approximate value may, depending on the context, include values +/−10%.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An optical thin film filter, comprising:

a first set of filter layers including:

a first layer with a first refractive index, and a second layer with the first refractive index; and a second set of filter layers including a third layer with a second refractive index, the first layer having a first thickness that is more than two times greater than a second thickness of the second layer, the first refractive index having a first value, and the second refractive index having a second value, such that the optical thin film filter has an effective refractive index greater than or equal to 95% of a refractive index of a highest refractive index component material of the optical thin film filter.

2. The optical thin film filter of claim 1, wherein an angle shift at a center wavelength of the optical thin film filter is less than 0.6% of the center wavelength for angles of incidence between 0 degrees and 30 degrees.

3. The optical thin film filter of claim 1, wherein the effective refractive index is determined by a relationship of a form:

$$n_{eff} = \frac{\lambda_0 \cdot \sin\theta}{\sqrt{\lambda_0^2 - \lambda_\theta^2}} \geq 0.95 \cdot n_H$$

wherein $n_{eff}$ is the effective refractive index, θ is a particular angle of incidence, $\lambda_0$ is a particular wavelength at a normal angle of incidence, $\lambda_\theta$ is an angle shifted wavelength at the particular angle of incidence, and wherein $n_H$ is the refractive index of the highest refractive index component material of the optical thin film filter.

4. The optical thin film filter of claim 1, wherein a bandpass of the optical thin film filter is between 200 nanometers (nm) and 14000 nm.

5. The optical thin film filter of claim 1, wherein a first material of the first set of filter layers and a second material of the second set of filter layers form a set of alternating high refractive index layers and low refractive index layers.

6. The optical thin film filter of claim 1, wherein at least one of the first layer, the second layer, or the third layer includes at least one of:

a silicon layer, a silicon dioxide layer, a hydrogenated silicon layer, a tantalum pentoxide layer, a niobium pentoxide layer, a niobium titanium oxide layer, a niobium tantalum oxide layer, a titanium dioxide layer, a silicon nitride layer, or an aluminum nitride layer.

7. The optical thin film filter of claim 1, wherein the optical thin film filter is at least one of:

a bandpass filter, a dual bandpass filter, an n-bandpass filter, a notch filter, a longwave pass filter, a shortwave pass filter, a polarizing beam splitter, or a non-polarizing beam splitter.

8. The optical thin film filter of claim 1, wherein the first refractive index is between 3.7 and 3.8, and wherein the second refractive index is between 1.4 and 1.5.

9. The optical thin film filter of claim 1, wherein the highest refractive index component material of the optical thin film filter is a hydrogenated silicon material with a refractive index of 3.75, and wherein the effective refractive index is greater than or equal to 3.56, and wherein a relative angle-shift at a 30 degree angle of incidence is less than 1.0% of a center wavelength of the optical thin film filter.

10. The optical thin film filter of claim 9, wherein the center wavelength is 940 nanometers (nm).

11. The optical thin film filter of claim 1, wherein the highest refractive index component material of the optical thin film filter is a niobium titanium oxide material with a refractive index of 2.38, and wherein the effective refractive index is greater than or equal to 2.261, and wherein a relative angle-shift at a 30 degree angle of incidence is less than 2.48% of a cut-off wavelength of the optical thin film filter.

12. The optical thin film filter of claim 11, wherein the cut-off wavelength is 650 nanometers (nm).

13. An optical thin film filter, comprising:

a plurality of filter layers, wherein the plurality of filter layers includes alternating high refractive index layers and low refractive index layers, wherein the plurality of filter layers is divided into a first subset of the plurality of filter layers and a second subset of the plurality of filter layers, wherein the high refractive index layers include:

a first layer with a refractive index and a first thickness that is greater than a first value, and a second layer with the refractive index and a second thickness that is less than a second value, wherein the first value is more than two times greater than the second value, and wherein the first value is less than five times greater than the second value; and wherein an effective refractive index value of the optical thin film filter is greater than 95% and less than 150% of a refractive index value of a highest refractive index component material of the optical thin film filter.

14. The optical thin film filter of claim 13, wherein the second subset of the plurality of filter layers does not form a set of quarter-wave stacks surrounding the first subset of the plurality of filter layers.

15. The optical thin film filter of claim 13, wherein the first subset of the plurality of filter layers is one or two of the high refractive index layers.

16. The optical thin film filter of claim 13, wherein the optical thin film filter has less than a 9.0 nanometer (nm) angle shift at a wavelength that is 940 nm, the high refractive index layers have refractive indices of between 3.7 and 3.8, the low refractive index layers have refractive indices of between 1.4 and 1.5, the refractive indices of between 3.7 and 3.8 include the refractive index, and an effective refractive index is between 4.0 and 5.5.

17. The optical thin film filter of claim 13, wherein the optical thin film filter is associated with a transmissivity of between 85% and 100% of a peak transmissivity of the optical thin film filter across a whole passband of the optical thin film filter and for angles of incidence of between 0 degrees and 30 degrees.

18. The optical thin film filter of claim 13, wherein the optical thin film filter is at least one of:

a bandpass filter,
a dual bandpass filter,
an n-bandpass filter,
a notch filter,
a longwave pass filter,
a shortwave pass filter,
a polarizing beam splitter, or
a non-polarizing beam splitter.

19. An optical system, comprising:

an optical transmitter device, an optical receiver device, and an optical thin film filter disposed in an optical path between the optical transmitter device and the optical receiver device, the optical thin film filter comprising:

a plurality of layers with a plurality of thicknesses and two or more refractive indices causing the optical thin film filter to achieve an angle shift of less than 5% of a center wavelength and with an effective refractive index between 95% and 120% of a highest index component material of the plurality of layers, wherein the plurality of thicknesses include:

a first thickness of a first layer, of the plurality of layers, with a refractive index of the two or more refractive indices, and a second thickness of a second layer, of the plurality of layers, with the refractive index, and wherein the first thickness is more than two times greater than the second thickness.

20. The optical system of claim 19, wherein the optical system is at least one of:

a facial recognition system,
an iris recognition system,
a gesture recognition system,
a LIDAR system,
a monitoring system, or
an imaging system.

* * * * *